(12) United States Patent
Cheng

(10) Patent No.: US 10,047,787 B2
(45) Date of Patent: Aug. 14, 2018

(54) TENSION ROD MECHANISM

(71) Applicant: Li-Ming Cheng, Kaohsiung (TW)

(72) Inventor: Li-Ming Cheng, Kaohsiung (TW)

( * ) Notice: Subject to any disclaimer, the term of this patent is extended or adjusted under 35 U.S.C. 154(b) by 0 days.

(21) Appl. No.: 15/237,702

(22) Filed: Aug. 16, 2016

(65) Prior Publication Data

US 2018/0051739 A1 Feb. 22, 2018

(51) Int. Cl.
*F16B 7/18* (2006.01)
*F16C 3/03* (2006.01)
*A47H 1/022* (2006.01)
*A47H 1/02* (2006.01)

(52) U.S. Cl.
CPC ............. *F16C 3/03* (2013.01); *A47H 1/022* (2013.01); *F16B 7/182* (2013.01); *A47H 2001/0215* (2013.01); *Y10T 403/68* (2015.01)

(58) Field of Classification Search
CPC .......... Y10T 403/68; Y10T 403/32491; Y10T 403/32501; Y10T 403/7054; Y10T 403/7056; Y10T 403/7058; Y10T 403/7069; Y10T 403/7077; Y10T 403/29; A47H 1/022; A47H 2001/0215; F16B 7/06; F16B 2007/16; F16B 7/1463; F16B 7/182; F16C 3/03; E21B 17/042
USPC ........ 211/105.4, 105.2, 105.3, 123; 403/343, 403/109.5, 369, 370, 374.4, 43; 248/200.1, 251, 265
See application file for complete search history.

(56) References Cited

U.S. PATENT DOCUMENTS

| | | | |
|---|---|---|---|
| 5,702,196 A * | 12/1997 | Petercsak | F16B 7/06 280/93.502 |
| 6,305,723 B1 * | 10/2001 | Schutz | E21B 17/042 285/333 |
| 8,827,587 B2 | 9/2014 | Didehvar | |
| 8,851,305 B2 | 10/2014 | Didehvar | |
| 8,851,435 B1 * | 10/2014 | Bastien | A47H 1/022 248/200.1 |
| 8,960,456 B2 | 2/2015 | Didehvar | |
| 9,107,529 B2 * | 8/2015 | Didehvar | A47H 1/022 |
| 9,388,837 B1 * | 7/2016 | Hanley | A47H 1/022 |
| 9,605,491 B2 * | 3/2017 | Langenfeld | E21B 17/03 |
| 2010/0316438 A1 * | 12/2010 | Sohn | A45B 9/00 403/109.1 |

(Continued)

FOREIGN PATENT DOCUMENTS

JP 2000046021 A 2/2000

*Primary Examiner* — Hiwot E Tefera
(74) *Attorney, Agent, or Firm* — Alan D. Kamrath; Kamrath IP Lawfirm, P.A.

(57) ABSTRACT

A tension rod mechanism includes an outer tube, an inner tube having an end received in the outer tube, and a fixing device. The fixing device includes an engaging member and an enveloping member. The engaging member includes an engaging portion and a rod connected to the engaging portion. The engaging portion is mounted to the end of the inner tube. The rod extends in the outer tube. The rod includes an outer threaded portion formed on an outer periphery thereof. The outer threaded portion is connected to an end face of the engaging portion. The outer threaded portion has a constant major diameter. The outer threaded portion includes increasing minor diameters from the engaging portion toward a free end of the rod. The enveloping member includes an inner periphery having an inner threaded portion engaged with the outer threaded portion.

8 Claims, 5 Drawing Sheets

(56) References Cited

U.S. PATENT DOCUMENTS

| | | | | |
|---|---|---|---|---|
| 2012/0076572 A1* | 3/2012 | Sohn | A45B 9/00 | |
| | | | 403/109.1 | |
| 2012/0152872 A1* | 6/2012 | Didehvar | A47H 1/022 | |
| | | | 211/105.4 | |
| 2012/0152874 A1* | 6/2012 | Didehvar | A47K 3/38 | |
| | | | 211/105.4 | |
| 2014/0116725 A1* | 5/2014 | Wollmann | E21B 17/042 | |
| | | | 166/380 | |
| 2014/0131299 A1* | 5/2014 | Didehvar | A47H 1/022 | |
| | | | 211/105.2 | |
| 2016/0319879 A1* | 11/2016 | Johnson | F16B 3/06 | |

* cited by examiner

TENSION ROD MECHANISM

BACKGROUND OF THE INVENTION

1. Field of the Invention

The present invention relates to a tension rod mechanism and, more particularly, to a tension rod mechanism including an inner tube and an outer tube movable relative to the inner tube to increase or shorten an overall length of the tension rod mechanism, with the inner and outer tubes fixed by a fixing device to fix the length.

2. Description of the Related Art

FIG. 1 shows a conventional tension rod mechanism 9 including an outer tube 91 and an inner tube 92, and a fixing device 93 for fixing the outer tube 91 and the inner tube 92. The fixing device 93 includes a plug 931 fixed to an end of the inner tube 92 by an engaging portion 9311. A screw rod 9312 is connected to an end face of the engaging portion 9311 and extends in the outer tube 91. The major diameter and the minor diameter of the screw rod 9312 increase from the engaging portion 9311 toward a free end of the screw rod 9312. A collar 932 is mounted around the screw rod 9312. By such an arrangement, when the inner tube 92 is moved to a suitable position relative to the outer tube 91, a user can rotate the inner tube 92 to move the collar 932 relative to the screw rod 9312 toward the free end of the screw rod 9312. Thus, the collar 932 is stretched open by the screw rod 9312 to press against the outer tube 91, thereby positioning the outer tube 91 and the inner tube 92. An example of the tension rod mechanism is disclosed in U.S. Pat. No. 8,960,456 entitled "MOLDED TENSION ROD MECHANISM WITH SINGLE LOCK NUT".

However, as shown in FIG. 2, since the major diameter d of the screw rod 9312 at the engaging portion 9311 is only a half of (or even smaller than) a width w of the engaging portion 9311 (the width w is approximately the same as an inner diameter of the inner tube 92), the engaging portion 9311 of the screw rod 9312 is the structurally weak point of the plug 931 and, thus, tends to fatigue and break. Furthermore, once the screw rod 9312 disengages from the engaging portion 9311, it is difficult to remove the engaging portion 9311 out of the inner tube 92. As a result, not only the plug 931 but the inner tube 92 must be replaced during maintenance, leading to difficulties and high costs in maintenance of the conventional tension rod mechanism.

Thus, a need exists for a novel tension rod mechanism that mitigates and/or obviates the above disadvantages.

SUMMARY OF THE INVENTION

To solve the above problem, the present invention provides a tension rod mechanism that can increase the structural strength of an engaging member in the inner tube to reduce the tendency of breakage without additional auxiliary members.

As used herein, the term "major diameter" means the maximum diameter of a thread, and the term "minor diameter" means the minimum diameter of a thread.

As used herein, the term "thread depth" means the spacing between the crest and the root of a thread in a direction perpendicular to a longitudinal axis of the thread.

A tension rod mechanism according to the present invention includes an outer tube, an inner tube having an end received in the outer tube, and a fixing device. The fixing device includes an engaging member and an enveloping member. The engaging member includes an engaging portion and a rod connected to the engaging portion. The engaging portion is mounted to the end of the inner tube. The rod extends in the outer tube and includes an outer threaded portion formed on an outer periphery thereof. The outer threaded portion is connected to an end face of the engaging portion. The outer threaded portion has a constant major diameter. The outer threaded portion includes increasing minor diameters from the engaging portion toward a free end of the rod. The enveloping member includes an inner periphery having an inner threaded portion engaged with the outer threaded portion.

By such an arrangement, the cross sectional area of a jointing area between the engaging portion of the engaging member and the rod does not change too quick and too soon. Thus, the structural strength of the engaging member can be increased without additional auxiliary members. The engaging member is less likely to break. As a result, the fixing device is more durable to reduce maintenance frequency of the tension rod mechanism.

In an example, the end face of the engaging portion connected to the outer threaded portion has a maximum width, and the major diameter of the outer threaded portion is larger than two thirds of the maximum width of the end face of the engaging portion. This structure can effectively reduce the change in the cross sectional area of the jointing area between the engaging portion of the engaging member and the rod, prolonging the service life.

In an example, the enveloping member includes a first end and a second end. The second end of the enveloping member is located between the first end of the enveloping member and the engaging portion of the engaging member. The inner threaded portion has a constant major diameter. The inner threaded portion has increasing minor diameters from the first end toward the second end of the enveloping member. This structure permits the enveloping member to uniformly and gradually expand in the radial direction while moving toward the free end of the rod, increasing the pressing reliability.

In an example, the enveloping member includes a first end and a second end. The second end of the enveloping member is located between the first end of the enveloping member and the engaging portion of the engaging member. The enveloping member includes an outer periphery having a plurality of grooves. Each groove extends from the first end toward but spaced from the second end of the enveloping member. This structure reduces the contact area between a portion adjacent to the first end of the enveloping member and an inner periphery of the outer tube, such that a portion adjacent to the second end of the enveloping member can be moved to an appropriate location more reliably, increasing the pressing reliability.

In an example, the enveloping member includes a first end and a second end. The second end of the enveloping member is located between the first end of the enveloping member and the engaging portion of the engaging member. The enveloping member includes an outer periphery having a guiding face at the second end of the enveloping member. This structure increases the smoothness for the enveloping member while moving toward the free end of the rod.

In an example, the enveloping member including a first end and a second end. The enveloping member further includes a slit extending from an inner periphery of the enveloping member through an outer periphery of the enveloping member. The slit extends from the first end through the second end of the enveloping member. This structure permits the user to stretch open the enveloping member via the slit, and the rod can be enveloped sideways, increasing convenience in assembly.

In an example, the enveloping member further includes a groove defined in the inner periphery thereof. The groove extends through the inner threaded portion and extends from the first end through the second end of the enveloping member. This structure permits the enveloping member to be stretched open more easily, increasing convenience in operation.

In an example, the slit and the groove are diametrically opposed to each other to increase convenience in operation and manufacturing.

DETAILED DESCRIPTION OF THE INVENTION

The present invention will become clearer in light of the following detailed description of illustrative embodiments of this invention described in connection with the drawings.

Figure 3:
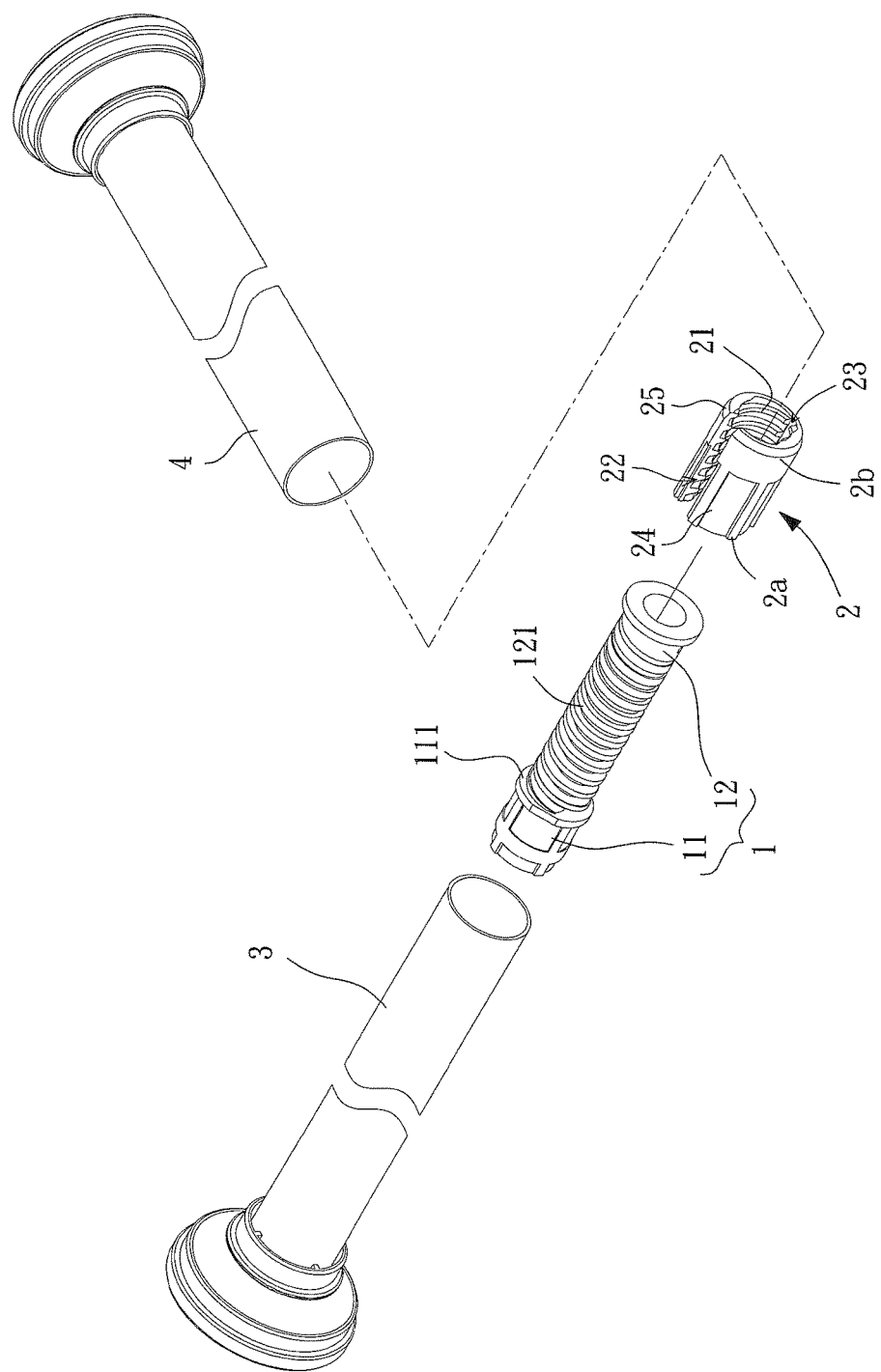
FIG. 3 is an exploded, perspective view of a tension rod mechanism of an embodiment according to the present invention.
Figure 4:
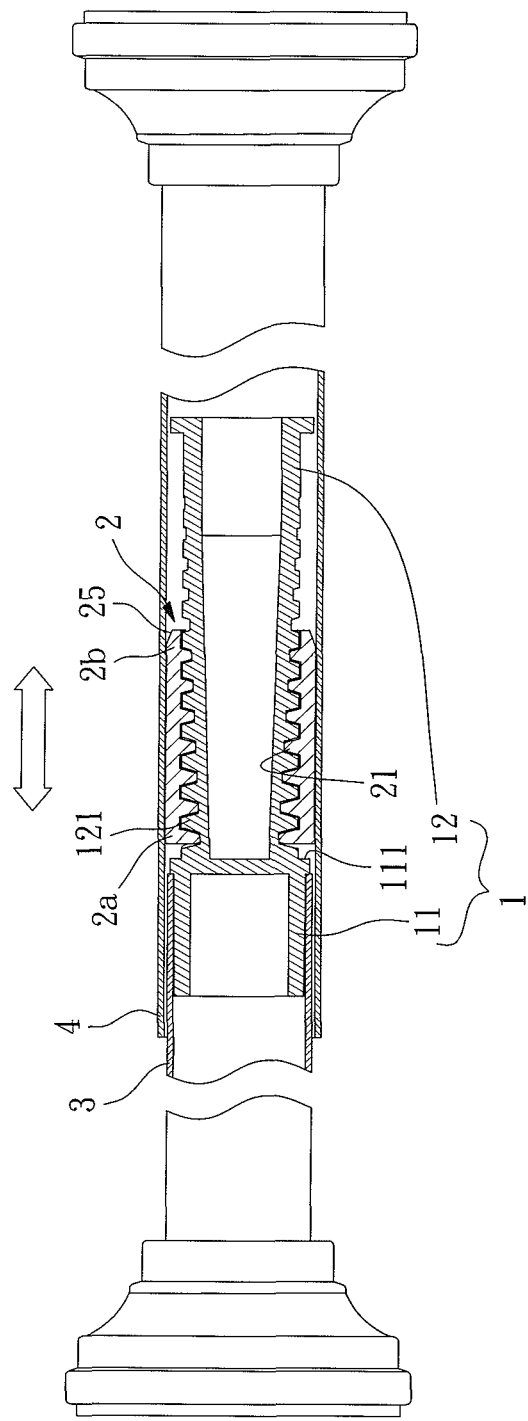
FIG. 4 is a diagrammatic, partly-sectioned, side view of the tension rod mechanism of FIG. 3 after assembly.

FIGS. 3 and 4 show a tension rod mechanism of an embodiment according to the present invention. The present invention relates to an improvement to a fixing device of the tension rod mechanism. The fixing device includes an engaging member 1 and an enveloping member 2. The engaging member 1 is mounted to an end of the inner tube 3. The engaging member 1 partially extends into an outer tube 4. The enveloping member 2 is movably engaged in a portion of the engaging member 1 in the outer tube 4. By adjusting the relative position between the engaging member 1 and the enveloping member 2, the inner tube 3 and the outer tube 4 can be moved relative to each other or fixed in place by the fixing device.

After the inner tube 3 and the outer tube 4 have been assembled, an end of the inner tube 3 extends in the outer tube 4, and the inner tube 3 and the outer tube 4 can displace relative to each other in an axial direction to adjust an overall length of the tension rod mechanism. The terms "inner tube" and "outer tube" used in the present invention indicate the relative positional relationship between two adjacent tubes in the inside and the outside. Particularly, the tube extending into the other is referred to as "inner tube", and the other is referred to as "outer tube". When there are more than two tubes extending through each other, the same tube is referred to as "inner tube" relative to a tube adjacent to an end thereof and is referred to as "outer tube" relative to another tube adjacent to the other end thereof. Furthermore, each pair of "inner tube" and "outer tube" can be engaged with and fixed to each other by a fixing device mentioned above. Only one inner tube, one outer tube, and one fixing device are described in a non-restrictive example in the following description in connection with the drawings. Nevertheless, when the number of the inner and outer tubes and the fixing members is increased, the structure and the operation are identical, which can be appreciated by a person having ordinary skill in the art, and detailed descriptions will not be set forth. Furthermore, the present invention is not limited to the type shown in the drawings.

Specifically, the engaging member 1 includes an engaging portion 11 and a rod 12. An end of the rod 12 is connected to an end face 111 of the engaging portion 11. The engaging member 1 is fixed to an end of the inner tube 3 by the engaging portion 11. The end face 111 of the engaging portion 11 is exposed on the end of the inner tube 3, and the rod 12 can extend into the outer tube 4 via an end of the outer tube 4.

The rod 12 includes an outer threaded portion 121 formed on an outer periphery thereof. The outer threaded portion 121 is connected to the end face 111 of the engaging portion 11. The outer threaded portion 121 has a constant major diameter D1 to present a substantially uniformly thick appearance. The outer threaded portion 121 includes increasing minor diameters D2 from the engaging portion 11 toward a free end of the rod 12. The end face 111 of the engaging portion 11 connected to the outer threaded portion 121 has a maximum width W. The major diameter D1 of the outer threaded portion 121 is preferably larger than two thirds (⅔) of the maximum width W of the end face 111 of the engaging portion 11.

Figure 1:
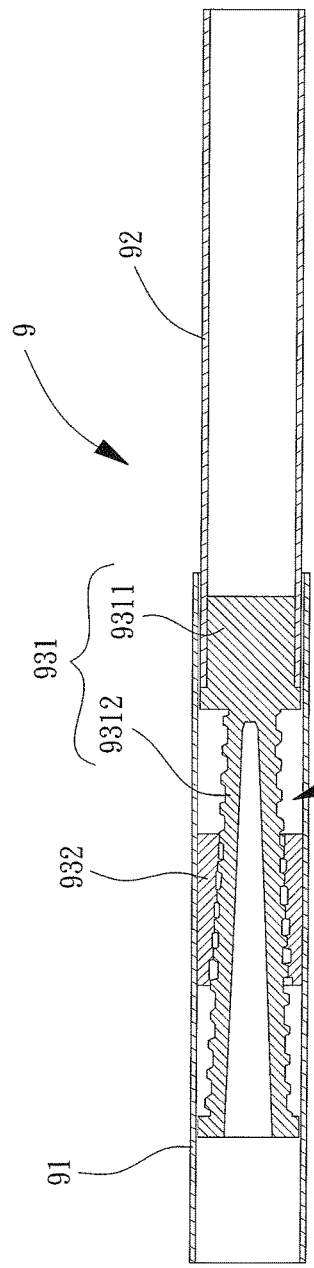
FIG. 1 is a diagrammatic cross sectional view of a conventional tension rod mechanism.
Figure 2:
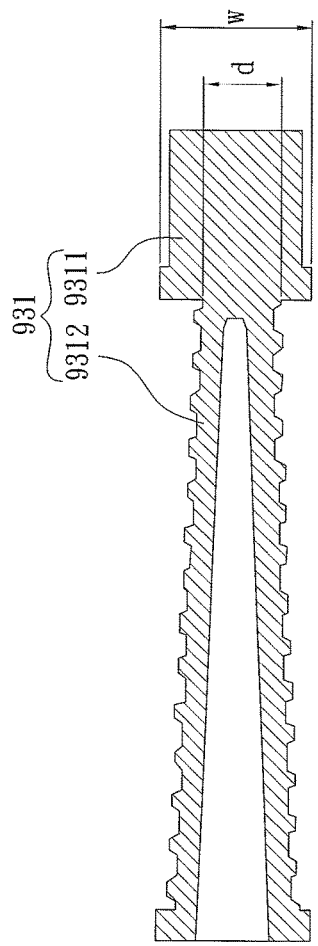
FIG. 2 is a cross sectional view of a plug of a fixing device of the tension rod mechanism of FIG. 1.

Still referring to FIGS. 2 and 3, the enveloping member 2 is substantially a cylindrical tube and includes a first end 2a and a second end 2b opposite to the first end 2a. The enveloping member 2 includes an inner periphery having an inner threaded portion 21. The enveloping member 2 is made of an elastically deformable material, such that the enveloping member 2 can directly be mounted around the rod 12 from an end of the rod 12. Alternatively, the enveloping member 2 includes a slit 22 extending from an inner periphery of the enveloping member 2 through an outer periphery of the enveloping member 2 and extending from the first end 2a through the second end 2b of the enveloping member 2. Thus, a user can stretch open the enveloping member 2 via the slit 22 and can envelope the rod 12 sideways, permitting the inner threaded portion 21 of the enveloping member 2 to engage with the outer threaded portion 121 of the engaging member 1. Furthermore, the first end 2a of the enveloping member 2 is located between the second end 2b of the enveloping member 2 and the engaging portion 11 of the engaging member 1.

In the example including the slit 22, the enveloping member 2 can further include a groove 23 defined in the inner periphery thereof. The groove 23 extends through the inner threaded portion 21 and extends from the first end 2a through the second end 2b of the enveloping member 2. Thus, the enveloping member 2 can be stretched open more easily, increasing operational convenience while assembling the enveloping member 2 with the rod 12. Preferably, the slit 22 and the groove 23 are diametrically opposed to each other to provide the best assembling convenience while permitting easy processing, providing manufacturing convenience.

With reference to FIG. 4, by the above structure, when the enveloping member 2 is close to the engaging portion 11, the rod 12 axially stretches open the enveloping member 2 to a smaller extent, such that the outer diameter of the enveloping member 2 is smaller. In this case, the enveloping member 2 loosely abuts the inner periphery of the outer tube 4. Thus, the inner tube 3 and the outer tube 4 can smoothly move relative to each other in the axial direction to adjust the overall length of the tension rod mechanism.

Figure 6:
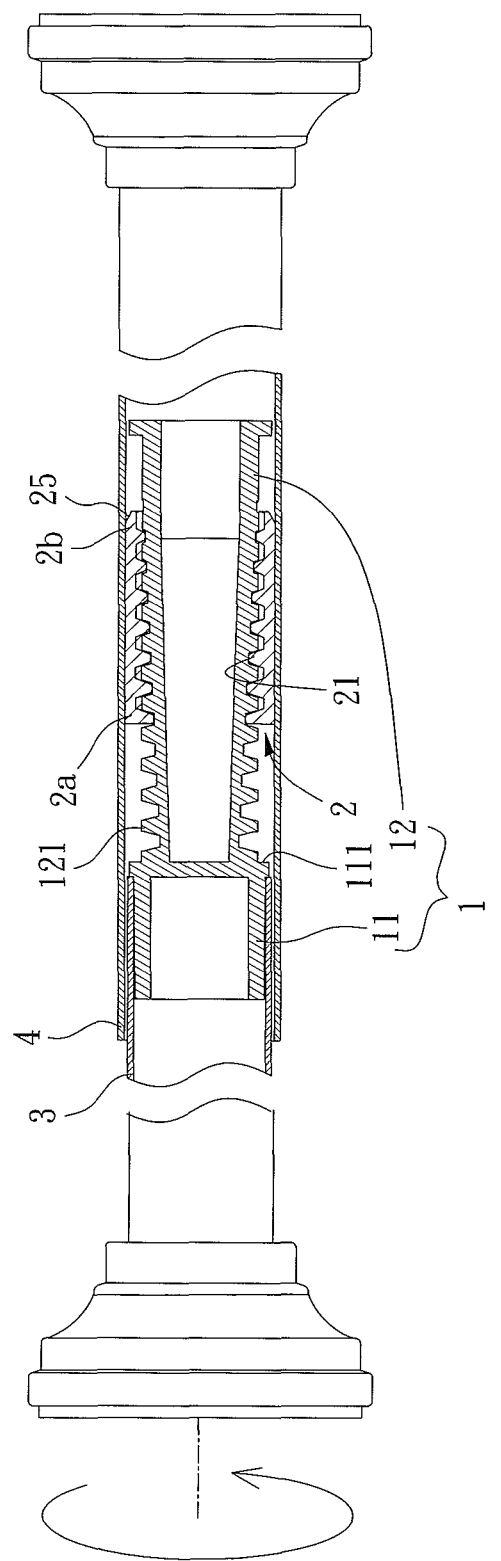
FIG. 6 is a diagrammatic, partly-sectioned, side view illustrating fixing of inner and outer tubes of the tension rod mechanism by a fixing device according to the present invention.

With reference to FIG. 6, when the inner tube 3 and the outer tube 4 are moved relative to each other to a desired position, the user can rotate the inner tube 3 to make the enveloping member 2 and the rod 12 displace relative to each other through the inner threaded portion 21 and the outer threaded portion 121. Thus, during movement of the enveloping member 2 toward the free end of the rod 12, the extent of the enveloping member 2 stretched opened by the rod 12 becomes larger, such that the outer diameter of the enveloping member 2 increases gradually. Thus, the pressing force against the inner periphery of the outer tube 4 by the enveloping member 2 is gradually increased until a desired tightness is reached. As a result, the inner tube 3 and the outer tube 4 are fixed by the fixing device to maintain the overall length of the tension rod mechanism.

Figure 5:
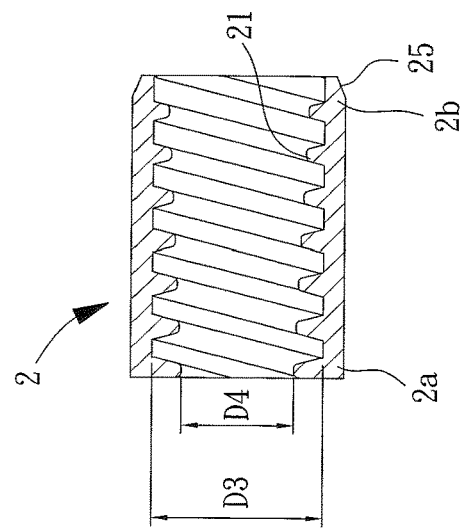
FIG. 5 is a cross sectional view of an engaging member and an enveloping member of the tension rod mechanism of FIG. 3.
Figure 5:
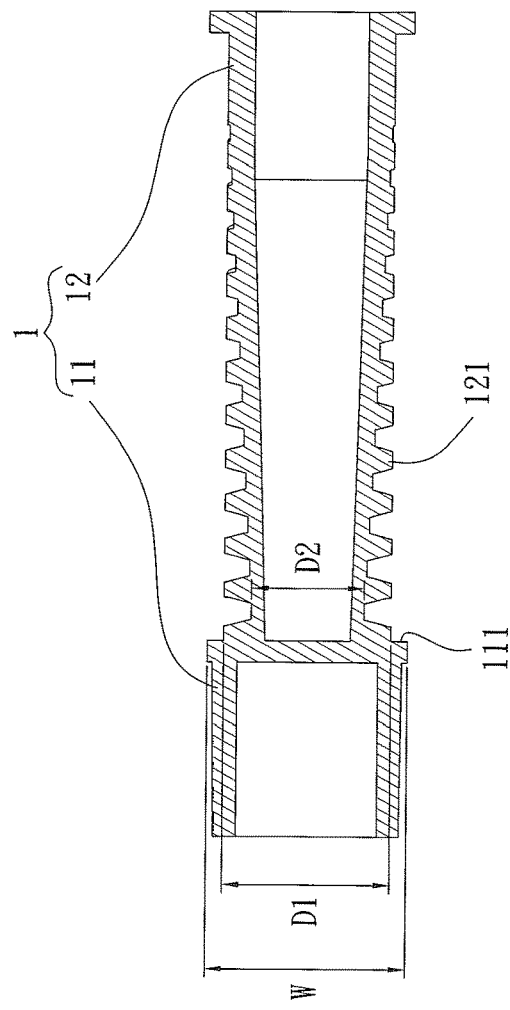

With reference to FIGS. 5 and 6, note that the inner threaded portion 21 has a substantially constant major diameter D3. The inner threaded portion 21 has increasing minor diameters D4 from the first end 2a toward the second end 2b of the enveloping member 2. Thus, the thread depth of the inner threaded portion 21 decreases from the first end 2a toward the second end 2b to match the thread pattern of the outer threaded portion 121 of the engaging member 1. Thus, during movement of the enveloping member 2 toward the free end of the rod 12, the enveloping member 2 is stretched more uniformly by the rod 12 and, thus, expands more uniformly in the radial direction, which is helpful in increasing the uniformity of the pressing tightness exerted on the inner periphery of the outer tube 4 by the enveloping member 2. A situation that the enveloping member 2 presses against the outer tube 4 by a portion adjacent to the second end 2b and that a gap exists between the outer tube 4 and a portion of the enveloping member 2 adjacent to the first end 2a (which situation will adversely affecting the reliability of the pressing effect) is less likely to occur.

Furthermore, with reference to FIG. 3, the enveloping member 2 can include a plurality of grooves 24 on the outer periphery thereof. Each groove 24 extends from the first end 2a toward but spaced from the second end 2b of the enveloping member 2. This arrangement reduces the contact area between a portion adjacent to the first end 2a of the enveloping member 2 and the inner periphery of the outer tube 4. Thus, when the enveloping member 2 is in a position close to the engaging portion 11 (see FIG. 4), the smoothness during relative axial displacement between the inner tube 3 and the outer tube 4 can be increased. Furthermore, during movement of the enveloping member 2 toward the free end of the rod 12, resistance is less likely to occur at a portion of the enveloping member 2 adjacent to the first end 2a, assuring that a portion adjacent to the second end 2a of the enveloping member 2 can be moved to an appropriate location (see FIG. 6) more reliably, firmly pressing against the outer tube 4. Furthermore, the outer periphery of the enveloping member 2 can include a guiding face 25 at the second end 2b, increasing the smoothness for the enveloping member 2 while moving toward the free end of the rod 12.

In view of the foregoing, in the tension rod mechanism according to the present invention, the fixing device permits the cross sectional area of a jointing area between the engaging portion 11 of the engaging member 1 and the rod 12 not to change too quick and too soon. Thus, the structural strength of the engaging member can be increased without additional auxiliary members. The engaging member 1 is less likely to break. As a result, the fixing device is more durable to reduce maintenance frequency of the tension rod mechanism.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A tension rod mechanism comprising:
an outer tube;
an inner tube including an end received in the outer tube; and
a fixing device including an engaging member and an enveloping member, with the engaging member including an engaging portion and a rod connected to the engaging portion, with the engaging portion mounted to the end of the inner tube, with the rod extending in the outer tube, with the rod including an outer threaded portion formed on an outer periphery thereof, with the outer threaded portion connected to an end face of the engaging portion, with the enveloping member including a first end and a second end, with the first end of the enveloping member located between the second end of the enveloping member and the engaging portion of the engaging member, with the outer threaded portion of the rod having a constant major diameter, with the outer threaded portion of the rod including increasing minor diameters from the engaging portion toward a free end of the rod, with a thread depth of the outer threaded portion of the rod decreasing from the engaging portion toward the free end of the rod, with the enveloping member including an inner periphery with an inner threaded portion engaged with the outer threaded portion of the rod, and with a thread depth of the inner threaded portion of the enveloping member decreasing from the first end toward the second end of the enveloping member.

2. The tension rod mechanism as claimed in claim 1, wherein the end face of the engaging portion connected to the outer threaded portion has a maximum width, and wherein the major diameter of the outer threaded portion is larger than two thirds of the maximum width of the end face of the engaging portion.

3. The tension rod mechanism as claimed in claim 1, with the inner threaded portion having a constant major diameter, and with the inner threaded portion having increasing minor diameters from the first end toward the second end of the enveloping member.

4. The tension rod mechanism as claimed in claim 1, with the enveloping member including an outer periphery having a plurality of grooves, and with each of the plurality of grooves extending from the first end toward but spaced from the second end of the enveloping member.

5. The tension rod mechanism as claimed in claim 1, with the enveloping member including an outer periphery having a guiding face at the second end of the enveloping member.

6. The tension rod mechanism as claimed in claim 1, with the enveloping member further including a slit extending from an inner periphery of the enveloping member through an outer periphery of the enveloping member, and with the slit extending from the first end through the second end of the enveloping member.

7. The tension rod mechanism as claimed in claim 6, with the enveloping member further including a groove defined in the inner periphery thereof, and with the groove extending through the inner threaded portion and extending from the first end through the second end of the enveloping member.

8. The tension rod mechanism as claimed in claim 7, wherein the slit and the groove are diametrically opposed to each other.

\* \* \* \* \*